No. 897,365. PATENTED SEPT. 1, 1908.
R. H. HEINZE.
CULTIVATOR.
APPLICATION FILED OCT. 5, 1907.

Witnesses

Inventor
Rosalia H. Heinze.
By C. A. Snow & Co.
Attorneys

UNITED STATES PATENT OFFICE.

ROSALIA H. HEINZE, OF KELLOGG, MINNESOTA.

CULTIVATOR.

No. 897,365.

Specification of Letters Patent.

Patented Sept. 1, 1908.

Application filed October 5, 1907. Serial No. 396,063.

*To all whom it may concern:*

Be it known that I, ROSALIA H. HEINZE, a citizen of the United States, residing at Kellogg, in the county of Wabasha and State of Minnesota, have invented a new and useful Cultivator, of which the following is a specification.

This invention relates to one-horse cultivators, and has for its principal object to provide a newer, quicker and less expensive form of implement for working more particularly in strawberry fields on a larger scale than at present and to a greater and better advantage.

A further object of this invention is to combine in one implement devices for disking, cultivating and dragging or harrowing ground at the same time, such operations being of greater benefit to strawberry plants than when these operations are performed independently, as less disturbance is caused to the plants and a greater amount of work is performed with less labor and time.

Another object of the invention relates to the construction of the frame whereby the implement is made to travel in one row or in two rows, straddling the plants, and when so working cuts the runners from the plants on both sides of the rows at the same time.

A still further object relates to certain adjustments for increasing and decreasing the pressure on the drags or harrows, and the lateral spread of the harrow frame.

With these and other objects in view, the invention comprises the various novel features of construction and combination and arrangement of parts, which will be hereinafter more fully described and pointed out particularly in the appended claims.

Figure 1:
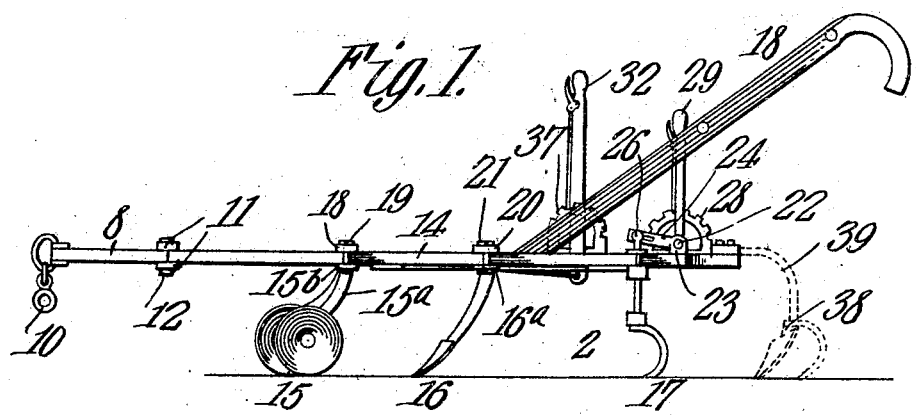
Figure 2:
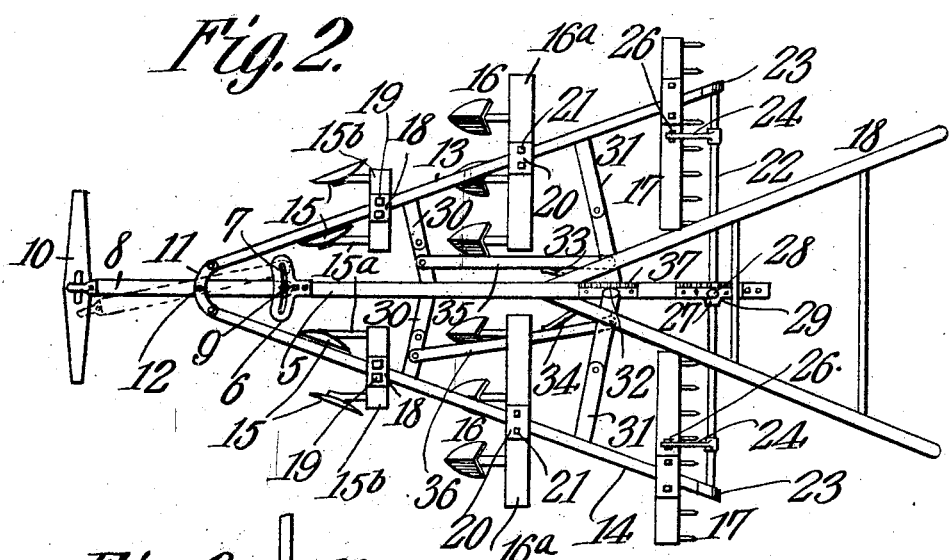
Figure 3:
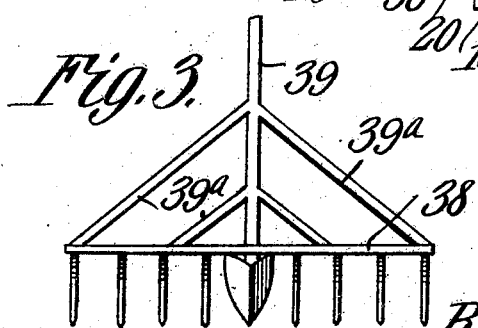
Figure 4:
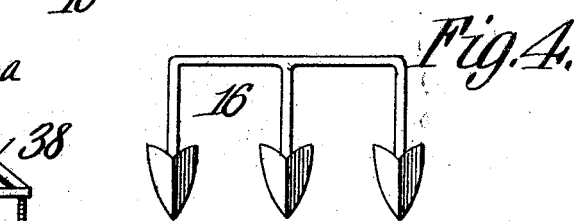

In the accompanying drawing:—Figure 1 is a side elevation of the harrow. Fig. 2 is a plan view of the same opened out. Figs. 3 and 4 are views of certain details of the invention.

Corresponding parts in the several figures are indicated throughout by similar characters of reference.

The central or main beam of the cultivator indicated by 5 is preferably made of a length of flanged metal to which the various parts of the cultivator are directly or indirectly attached. On the forward end of the beam 5 is an arc-shaped coupling 6 having a curved slot 7 therein and a stem riveted or bolted to said beam. A short beam 8 has its rear end adjustably fastened to said coupling 6 by a bolt 9 passing through the slot 7. The forward end of the beam 8 carries a swingletree 10.

Intermediately secured to the short beam 8 between the head 6 and the swingletree 10 is a bracket 11 connected to the beam 8 by a vertical pivot bolt 12. When the cultivator is set, as in Fig. 2, to straddle the row of plants to be cultivated, the bolt 9 is loosened and the short beam 8 turned to one side or the other, as in dotted lines, in order to let the horse or other animal drawing the cultivator walk between the rows of plants. Pivoted to the ends of the bracket are two beams 13 and 14 extending rearwardly one on each side of the central beam 5 each of which carries a pair of disks 15, a gang of cultivators 16 and a drag or harrow 17. Conveniently attached to the main beam 5 are handles 18 of the usual form.

The disks 15 are at the forward end of the cultivator and are each mounted on an arm $15^a$ fastened in pairs to clip plates $15^b$, each clip plate having a movable connection with one of the side beams 13 and 14. This connection is shown in the drawing as comprising the plate $15^b$ below the side beam, a plate 18 above the same, and bolts 19 extending through said plates. By loosening these bolts, the disks may be moved forward or backward on their supporting beams. To properly operate upon the ground, these disks are not set in line with the direction of movement of the cultivator, but have their rear sides inclined outwardly, as shown in Fig. 2, so that when cutting ground and runners of the plants they will be forced away from the row. In place of the disks 15, knives or rolling colters may be used, but as these are common in the art, they have not been illustrated.

Behind the disks are the cultivating shovels 16 there being three attached to each side beam 13 by means of a plate $16^a$ carrying the shovels and extending transversely of the beam on its under side, and a clamping plate 20 on the upper side of the beam and bolts 21 for fastening the two plates together. This arrangement permits the cultivators to move on the side beams in the same manner as the disks move. The innermost cultivator shovel on each side of the main beam 5 follows directly behind the inner disk on the same side and tends to break up the clods or lumps of dirt thrown out by said disks. Still further to the rear are the drags or harrows 17 adjustably attached to the side beams 13 and 14. This adjustment permits of forward and rearward movement similar to that of the disks and cultivator, but besides the forward and rearward movement of the harrows, they have a vertical movement, the object of which is to force them, more or less, into the ground to pulverize it as deep as the nature of the plants under cultivation calls for. This is accomplished by a cross shaft 22 extending from the side beam 13 to the opposite beam 14 turning in bearings 23 thereon and having an arm 24 projecting forwardly on each side with a downwardly extending link 26 connected to and bearing on the harrow frame. A bearing 27 fastened to the main beam 5 carries a toothed arc 28 to engage with a locking device of any ordinary form on a hand lever 29 fixed to the shaft 22 where it passes through the bearing 27. As the lever moves to and fro, the harrows or drags are raised and lowered, and when the proper depth has been reached, they are held locked by the toothed arc engaging the locking device on the hand lever 29.

As shown in Fig. 2, the invention is represented as spread to operate as a straddle-row cultivator. If it be desired to narrow or reduce the width of the implement so that it may be used between rows of plants, the mechanism now about to be described is used for that purpose. Pivoted to each side beam 13 and 14 are two jointed bars 30 and 31 extending inwardly toward the main beam 5 beneath which they are hinged. The joint in each bar is midway between the ends so that when the bars are folded, the side beams 13 and 14 will swing on their end pivots towards the central beam 5.

The folding of the jointed rods 30 and 31 is accomplished by means of a hand lever 32 pivoted to the central beam 5, one arm of which extends below said beam and is connected by links 33 and 34 to rods 35 and 36, respectively, pivoted to the jointed bars 30 and 31. The rods 35 and 36 may be connected to the inner or outer sections of both bars 30 and 31, or to one inner section and one outer section, as shown. The hand lever has a locking bolt of usual type for engaging a toothed sector 37.

In addition to the several cultivator devices hereinabove described, there is further provided a combination cultivator comprising a central shovel and side harrow teeth attached to the same beam from which a standard rises and is bolted to the extreme rear end of the central beam 5. This peculiar cultivating implement is represented in Fig. 3 where a cultivator shovel and a series of harrow teeth are shown attached to a beam 38 from the center of which a standard 39 rises to be attached, as heretofore stated, on the rear of the main beam 5. Braces 39ª extend between the standard and the beam to hold the latter rigid.

In operating a device of this character as a straddle row cultivator, the implement will be set as in Fig. 2, with the exception of the short beam 8 to which the swingletree is attached, that being turned to the position represented by dotted lines. The horse being now hitched to the cultivator will travel between two rows of plants while the cultivator will straddle one of the rows, the disks 15 cutting all runners from the plants should they be strawberry vines under cultivation, and, cutting into the earth, will throw it up in larger or smaller lumps, depending upon the quality of the earth. Following the disks are the cultivator hoes or shovels which break up the lumps thrown out by the disks into smaller pieces, and these small pieces are finally reduced by the drags or harrows at the rear of the implement. When used as a straddle row cultivator, the combination implement of Fig. 3 is not employed, but when the side beams are folded and the cultivator is used between rows, this attachment is applied and works up all lumps which have passed through the previously mentioned implement.

What is claimed is:—

1. A cultivator comprising a main central beam, a beam on each side of said main beam extending forwardly beyond the end of said main beam and pivotally connected to the ends of a bracket, a secondary beam fulcrumed to said bracket between its ends and adjustably fastened to the forward end of the main beam, earth engaging implements on each side beam, and means for laterally moving said side beams.

2. A cultivator comprising a main central beam, a beam on each side of said main beam extending forwardly beyond the end of said main beam, a bracket pivotally attached at its ends to the forward ends of said side beams, a coupling fastened to the forward end of the main beam, a secondary beam fulcrumed to said connecting bracket and adjustably secured to said coupling, said secondary beam being movable in a horizontal plane, earth engaging implements on each side beam, and means for moving said side beams to and from the main beam.

3. A cultivator comprising a main beam, a secondary beam in front of said main beam pivoted to a bracket and having its rearward end adjustably attached to the forward end of said main beam, a beam pivoted to said bracket on each side of the main beam, each of said side beams carrying earth engaging implements, means for raising and lowering certain of said earth engaging implements, and means for moving said side beams close to or away from said main beam.

4. A cultivator comprising a main central beam, a secondary forward beam capable of being turned at an angle to said main beam and having means for attaching a horse thereto, a coupling on the forward end of said main beam to which is connected the rear end of said secondary beam, and a transverse slot for a fastening bolt to permit said secondary beam to move laterally, a bracket in which said secondary beam is fulcrumed and having lateral projections, a side beam pivoted in each lateral projection and adapted to move to and from said main beam, and means for moving said side beams.

In testimony that I claim the foregoing as my own, I have hereto affixed my signature in the presence of two witnesses.

ROSALIA H. HEINZE.

Witnesses:
CLARA L. HEINZE
MICHAEL MARX